United States Patent [19]
Kajikawa et al.

[11] Patent Number: 5,834,087
[45] Date of Patent: Nov. 10, 1998

[54] POLYOLEFIN-BASED CARPET TILE

[75] Inventors: Teruo Kajikawa, Yokosuka; Yasuhiko Ganno, Ebina; Junichi Takeda, Kitakatsuragi-gun; Shuichi Yonezawa, Ikoma-gun, all of Japan

[73] Assignees: Nippon Petrochemicals Co. Ltd., Tokyo; Suminoe Orimono Kabushiki Kaisha, Osaka, both of Japan

[21] Appl. No.: 802,822

[22] Filed: Feb. 19, 1997

Related U.S. Application Data

[63] Continuation of Ser. No. 62,009, May 14, 1993, abandoned.

[30] Foreign Application Priority Data

| May 14, 1992 | [JP] | Japan | 4-165223 |
| May 15, 1992 | [JP] | Japan | 4-165279 |
| Sep. 28, 1992 | [JP] | Japan | 4-258313 |

[51] Int. Cl.$^6$ ..................................................... B32B 3/02
[52] U.S. Cl. ............................. 428/95; 428/97; 525/240
[58] Field of Search ...................... 428/97, 95; 525/240

[56] References Cited

U.S. PATENT DOCUMENTS

| 3,684,600 | 8/1972 | Smedberg | 156/93 |
| 3,914,489 | 10/1975 | Smedberg | 428/97 |
| 4,010,301 | 3/1977 | Anderson et al. | 428/95 |
| 4,010,302 | 3/1977 | Anderson et al. | 428/95 |
| 4,012,547 | 3/1977 | Smedberg | 428/97 |
| 4,242,397 | 12/1980 | Zuckerman et al. | 428/97 |
| 4,420,341 | 12/1983 | Ferrigno | 428/15 |
| 4,443,575 | 4/1984 | Iwai et al. | 428/97 |
| 4,536,529 | 8/1985 | Frye et al. | 524/284 |
| 4,576,665 | 3/1986 | Machell | 428/97 |
| 4,582,554 | 4/1986 | Bell et al. | 428/95 |
| 4,689,257 | 8/1987 | Slosberg et al. | 428/97 |
| 4,824,709 | 4/1989 | Tschirch | 428/97 |
| 4,851,463 | 7/1989 | Opsahl et al. | 524/109 |
| 4,872,930 | 10/1989 | Kajikawa et al. | 156/72 |
| 4,942,074 | 7/1990 | Bell et al. | 428/95 |
| 4,966,920 | 10/1990 | Gainer et al. | 524/701 |
| 5,391,612 | 2/1995 | Johnson | 524/556 |

FOREIGN PATENT DOCUMENTS

| 632371 | 4/1991 | Australia . | |
| 0 384 420 | 8/1990 | European Pat. Off. | 428/95 |
| 55-71734A | 5/1980 | Japan . | |
| 0142644 | 11/1980 | Japan | 428/95 |
| 56-53141A | 5/1981 | Japan . | |
| 56-88464A | 7/1981 | Japan . | |
| 1247654 | 10/1989 | Japan | 428/95 |
| 03-124884 | 5/1991 | Japan . | |
| 93/19654 | 10/1993 | WIPO | 428/95 |

*Primary Examiner*—Terrel Morris
*Attorney, Agent, or Firm*—Scully, Scott, Murphy & Presser

[57] ABSTRACT

The present invention provides a tile carpet comprising a sealer layer of a novel hot-melt type composition low in fumability (fuming property) and superior in a sealing effect and backing layers of a composition low in fumability. The tile carpet has a structure in which a backing layer (A) of a composition comprising an amorphous polyolefin and a filler containing magnesium hydroxide; a glass or polyester non-woven fabric; a backing layer (B) of a compositon comprising an amorphous polyolefin and a filler containing magnesium hydroxide; a glass or polyester crossed fabric; and a carpet cloth having a sealer layer (C) of a composition comprising, an amorphous polyolefin and a filler, are laminated to one another successively in this order.

10 Claims, 1 Drawing Sheet

POLYOLEFIN-BASED CARPET TILE

This application is a continuation of application Ser. No. 08/062,009 filed May 14, 1993, now abandoned.

BACKGROUND OF THE INVENTION

The present invention relates to a tile carpet comprising a sealer (or precoat) layer of a novel hot-melt type composition low in fumability (fuming property) and superior in a sealing (or precoating) effect and backing layers of a composition low in fumability. This tile carpet has a backward warp (warpage) to permit the carpet to come into close contact with the floor surface easily without leaving any gap and is thus superior in shape stability.

Generally, tile carpets are square in shape, 500 mm in one side, and are apt to undergo dimensional changes under the influence of a manufacturing method, variations in temperature, deformations by cleaning and deformations with the lapse of time. For example, a decrease of 1 mm in size results in gaps becoming conspicuous and marked impairment of beauty. Further, since a tile carpet is constituted by a laminate of different materials, there sometimes occurs a vertical warp. For example, if the corner and peripheral portions of a tile carpet warp up, there is a danger of a walker stumbling over those portions when walking on the carpet. To avoid this, various measures have heretofore been proposed. For example, there have been proposed dispersing short glass fibers in a backing layer (Japanese Patent Laid Open No. 39226/1974), non-woven fabric/polyvinyl chloride base layer/adhesive/sealed carpet (Japanese Patent Laid Open No. 138416/1983), the use of a net-like intermediate fabric having a small linear expansion coefficient (The U.S. Pat. No. 4872930).

Such proposed methods are suitable for certain backing materials and backing methods, but have not always been applicable to all materials and methods. This is because backing materials are different in chemical structure, the state of crystal, molecular weight, formulation, etc., so it is inevitably required to change the backing temperature and change the kind and weight of a reinforcing fabric as well as how to insert it. Combination of processing conditions exerts an influence upon the shape stability and the state of warp of the resulting tile carpet.

Recently, amorphous polyolefins have been attracted attention of many concerns for the following reason. During combustion, the amount of fume generated from an amorphous polyolefin is relatively small and the amount of harmful gases contained therein is also small. Because of these characteristics, when a bad influence upon the sufferer in the event of a fire and environmental pollution at the time of incineration of used goods are taken into consideration, the use of an amorphous polyolefin is advantageous. In the case of obtaining a tile carpet superior in shape stability, using as a sealer and a backing material a composition which contains such amorphous polyolefin as a main component, there have heretofore been obtained only a tile carpet of a large deformation due to a high processing temperature which is ascribable to a high softening point of the amorphous polyolefin. Thus, according to the methods proposed heretofore, it has been difficult to obtain a tile carpet having a high shape stability.

A carpet sealer is used for preventing the napping or fuzzing of a carpet base or for imparting a high strength against thread extraction to the carpet. As the sealer there usually is employed an aqueous dispersion type or a hot-melt type. More particularly, any of various polymeric latex or emulsion compositions, typical of which is a composition comprising a carboxy-modified styrene-butadiene copolymer latex, is applied and impregnated into a carpet base for houses at large. In the case of using such latex or emulsion, however, a large-sized apparatus is required because the coating is followed by heat-drying or vulcanization; besides, there is a fear of deterioration of the carpet base due to a high heating temperature and a long heating time, and the working efficiency is also deteriorated. Further, it is necessary to provide disposal equipment for waste liquid which is generated inevitably, but this is uneconomical. There have also been proposed carpet bases for automobiles containing as a base material a polymeric material serving as both a sealer and a backing material, such as, for example, hot-melt type ethylene-vinyl acetate copolymer, ethylene-ethyl acrylate copolymer, or olefin elastomer. For example, there have been proposed a composition comprising ethylene-vinyl acetate copolymer/process oil/filler (The U.S. Pat. No. 4263196), a composition comprising a copolymer of ethylene and vinyl acetate or ethyl acrylate/barium sulfate/ plasticizer (EP-A-19926), and a composition comprising olefin elastomer/filler (The U.S. Pat. No. 4508771). However, such conventional hot-melt type sealers and backing materials are inferior in the penetrating power into the carpet base and their napping preventing effect and effect of improving the strength against thread extraction in a tile carpet cannot be said satisfactory.

In the conventional tile carpets there are compositions which each individually fulfill both the function of a sealer and that of a backing material to a satisfactory extent. A polyvinyl chloride composition is one of such compositions. Since polyvinyl chloride resin has an amorphous, soft rubber-like elasticity and is superior in proccessability, it is often used in the production of a tile carpet. However, in the event of combustion of a polyvinyl chloride composition, the amount of fume is large and there are generated a large amounts of harmful gases such as hydrogen chloride gas and carbon monoxide gas, so the danger in a fire is high. Further, at the time of incineration of a waste carpet, a chlorine compound strong in toxicity is produced, which causes environmental pollution and is apt to damage the incinerator.

It is the object of the present invention to provide a tile carpet which scarcely undergoes any dimensional change, does not permit a gap to be formed between adjacent such tile carpets after laid on a floor surface, having a slight backward warp to make it easy for the tile carpet to come into close contact with the floor surface and superior in shape stability, as well as a method for producing the same, further provide a sealer capable of attaining the anti-napping property and high strength against thread extraction which are required in the field of tile carpets, without using any of conventional sealers of various polymeric material latex or emulsion compositions, as well as a sealing method for a carpet base, and still further provide a tile carpet having a sealer layer and backing layers formed of compositions which, during combustion, produce only a very small amount of fume, do not evolve such a poisonous gas as hydrogen chloride, and from which is generated little carbon monoxide gas, as well as a method for producing the same.

SUMMARY OF THE INVENTION

The present invention, in a first aspect thereof, resides in a tile carpet having a structure in which a backing layer (A) of a composition comprising an amorphous polyolefin and a filler containing magnesium hydroxide; a glass or polyester non-woven fabric; a backing layer (B) of a composition comprising an amorphous polyolefin and a filler containing magnesium hydroxide; a glass or polyester crossed fabric; and a carpet cloth (a carpet base) having a sealer layer (C) of a composition comprising an amorphous polyolefin and a filler preferably containing magnesium hydroxide, are laminated to one another successively in this order.

The present invention, in a second aspect thereof, resides in a method for producing a tile carpet, which method comprises laminating onto an easily releasable substrate a backing layer (A) of a composition comprising an amorphous polyolefin and a filler containing magnesium hydroxide; a glass or polyester non-woven fabric; a backing layer (B) of a composition comprising an amorphous polyolefin and a filler containing magnesium hydroxide; a glass or polyester crossed fabric; and a carpet cloth (a carpet base) having a pre-applied and -impregnated sealer layer (C) of a composition comprising an amorphous polyolefin and a filler preferably containing magnesium hydroxide, successively in this order to form an integral laminate, then cooling the laminate to solidify the resin component which has been in a melted or softened state, and thereafter peeling the laminate from the easily releasable substrate.

The present invention, in a third aspect thereof, resides in a method for producing a tile carpet, which method comprises laminating onto a carpet cloth (a carpet base) a sealer layer (C) of a composition comprising an amorphous polyolefin and a filler preferably containing magnesium hydroxide; a glass or polyester crossed fabric; a backing layer (B) of a composition comprising an amorphous polyolefin and a filler containing magnesium hydroxide; a glass or polyester non-woven fabric; and a backing layer (A) of a composition comprising an amorphous polyolefin and a filler containing magnesium hydroxide, successively in this order to form an integral laminate, and then cooling the laminate to solidify the resin component which has been in a melted or softened state.

DETAILED DESCRIPTION OF THE INVENTION

Figure 1:
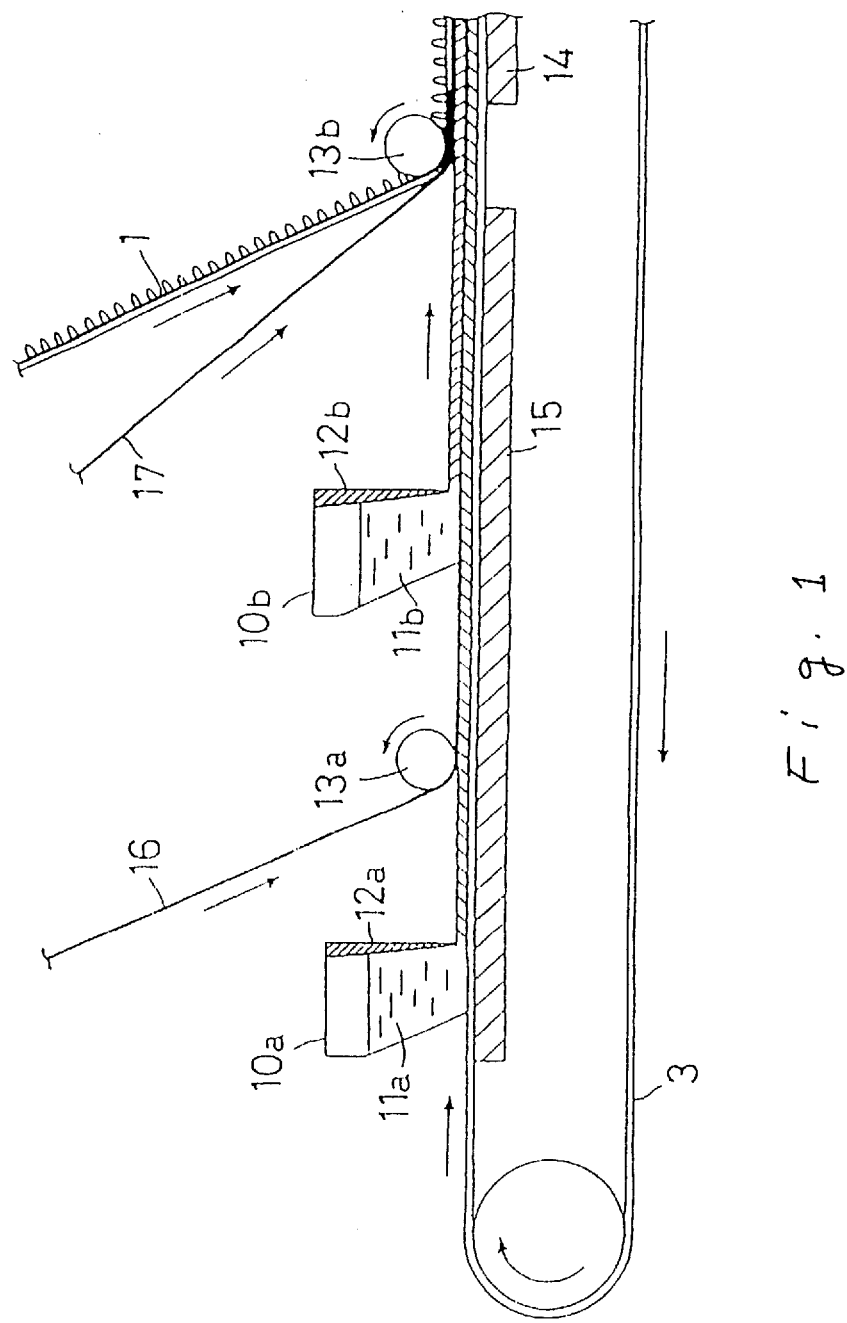
FIG. 1 is a schematic process diagram showing an example of the method of the present invention.
1 : carpet cloth (carpet base)
3 : endless belt (substrate)
10a, 10b : knife coaters
11a, 11b : backing compositions
12a, 12b : doctor knives
13a, 13b : pressure rolls for lamination
14 : cooling plate
15 : heating plate
16 : glass or polyester non-woven fabric
17 : glass or polyester crossed fabric

The composition which constitutes the backing layer (A) and the composition which constitutes the backing layer (B), each comprising an amorphous polyolefin and a filler containing magnesium hydroxide, have each the following components. Both compositions may be the same or different as long as they have the following composition. Using the same composition is usually advantageous in the production of a tile carpet according to the present invention.

Preferably, the compositions each comprise 13–88% (hereinafter, % means weight % unless otherwise defined) of an amorphous polyolefin, 1–10% of a crystalline polyolefin, 1–30% of a tackifier resin, 0–30% preferably 1–30% of a wax and 10–85% of a filler which contains magnesium hydroxide as an essential component.

As examples of the amorphous polyolefin used in the present invention there are mentioned those obtained by the homopolymerization of olefins such as propylene and butene, as well as the copolymerization thereof with ethylene. More concrete examples are amorphous polypropylene, amorphous propylene- ethylene copolymer, amorphous propylene-butene copolymer and amorphous polybutene. These polyolefins can be prepared by polymerizing olefins in the presence of hydrogen, using as a polymerization catalyst a titanium catalyst supported on magnesium chloride and an alkylaluminum compound, e.g. triethylaluminum.

An amorphous polyolefin having a melt viscosity of 1,000 to 30,000 cP at 190° C. is suitable for the object of the present invention, and an amorphous polyolefin having, in addition to such a melt viscosity, a number average molecular weight of 2,000 to 20,000, a softening point of 100° to 165° C. (according to a ring and ball method), a penetration of 10 to 45 dmm and a low-temperature flexing resistance (10 mm$\phi$) of $-10°$ to $-35°$ C., is preferred.

For example, in the case of an amorphous polyolefin which is obtained as a by-product in a conventional crystalline polypropylene manufacturing process, since it is a by-product, it is impossible to optionally choose desired melt viscosity, softening point, penetration and low-temperature flexing resistance, and thus it is difficult to obtain an amorphous polyolefin of a stable quality having physical properties suitable for the object of the invention.

Therefore, such by-product is not suitable for use in the present invention, and an amorphous polyolefin produced so as to suit the object of the invention is suitable.

Examples of crystalline polyolefins employable in the present invention are high, medium and low density polyethylenes, polypropylenes, polybutenes, propyleneethylene random or block copolymer, ethylene-butene copolymer and propylene-butene random copolymer. The crystalline polyolefin used in the invention should exhibit a crystallinity of at least 50% as determined by an X-ray method. A suitable MFR range is 1 to 800. Usually, the crystalline polyolefin is used in an amount of 1% to 10% in order to impart hardness and heat resistance to the composition in question. If the amount thereof is smaller than 1%, its use will not be effective, and an amount thereof exceeding 10% will result in the composition becoming fragile. Thus, both such values outside the range specified above are not desirable. Crystalline propylene polymers are preferred.

Examples of waxes employable in the present invention include paraffin wax, microcrystalline wax, low molecular weight polyethylene wax, and other animal and vegetable waxes. For lowering the melt viscosity, wax is used usually in an amount of 0% to 30%, preferably 1% to 30%, relative to the entire composition. If the amount of the wax used is smaller than 1%, there will not be obtained a melt viscosity lowering effect, and an amount thereof exceeding 30% will result in the composition becoming fragile and inferior in heat resistance.

The filler is used mainly for attaining an economic effect of reducing the cost. Examples are calcium carbonate, clay talc, diatomaceous earth, calcium sulfate, barium sulfate, zinc white, magnesium hydroxide, aluminum hydroxide and fly ash. Magnesium hydroxide is used as an essential component in the present invention. If magnesium hydroxide is used as a mixture with a filler other than magnesium hydroxide, e.g. calcium carbonate, at a weight ratio of 1:99 to 99:1, preferably 1:9 to 9:1, there will be obtained an effect of suppressing the amount of fume generated at the time of combustion. Usually, the filler is used in a proportion of 10% to 85%. If the proportion of the filler is less than 10%, its use will not be effective, and a proportion thereof exceeding 85% will result in the viscosity becoming too high and hence will make it difficult to apply and impregnate the composition into the carpet cloth.

The tackifier resin is used for imparting tackiness to the carpet cloth and there may be used a known one such as a petroleum resin or a natural resin. Resins compatible with polyolefins, such as aliphatic, alicyclic and hydrogenated aromatic petroleum resins, are suitable. Examples are rosin, rosin hydride, terpene resins, hydrogenated aromatic petroleum resins, cyclopentadiene resin and C5 fraction polymer resins. The amount of the tackifier resin used is usually in the range of 1% to 30%. If the amount thereof is less than 1%, there will not be obtained a tackiness imparting effect, and an amount thereof exceeding 30% will result in deteriorated heat resistance and the composition becoming fragile.

Within the range not impairing the effect of the present invention there may be used a known lubricant such as, for example, a higher fatty acid, a higher fatty acid salt, a higher fatty acid ester, a higher alcohol, an oil or fat, or a phthalic acid ester. Further, there may be used a pigment for improving the appearance of the coated surface, and an electrically conductive filler such as carbon fibers, metallic fibers or carbon black for imparting electric conductivity to the composition.

The sealer layer (C) of a composition comprising an amorphous polyolefin and a filler is preferably of a composition comprising 13–88% of an amorphous polyolefin, 1–10% of a crystalline polyolefin, 1–30% of a tackifier resin and 10–85% of a filler which more preferably contains magnesium hydroxide.

The amorphous polyolefin used as a constituent of the sealer layer (C) is basically the same as that defined previously in connection with the composition which constitutes the backing layer (A) or (B). But one which exhibits the following properties is suitable: melt viscosity (at 190° C.) 300 to 6,000 cP, number average molecular weight (GPC method) 1,000 to 10,000, softening point (R&B method) 100 to 170° C., penetration 8 to 40 dmm, low-temperature flexing resistance (10 mmφ) −5° to −30° C.

The crystalline polyolefin, tackifier resin and filler which preferably contains magnesium hydroxide, as ingredients of the composition constituting the sealer layer (C), are also the same as those defined previously in connection with the composition constituting the backing layer (A) or (B).

Also as to the purposes and proportions the amorphous polyolefin, crystalline polyolefin, tackifier resin and filler which preferably contains magnesium hydroxide, they are the same as those defined previously in connection with the composition constituting the backing layer (A) or (B).

Within the range not impairing the effect of the sealer used in the present invention, a known lubricant may be incorporated in the composition constituting the sealer layer (C), in addition to the ingredients referred to above. Examples are waxes, higher fatty acids, higher fatty acid salts, higher fatty acid esters, higher alcohols, oils and fats, phthalic acid esters. Further, there may be used a pigment for improving the appearance of the coated surface and an electrically conductive filler such as carbon fibers or metallic fibers for imparting electric conductivity to the composition.

The sealer used in the present invention is a hot-melt type, and in the application and impregnation thereof into the carpet cloth, the sealer composition of the above formulation preferably has a melt viscosity in the range of 100 to 30,000 cP at 190° C. Since the sealer composition used in the invention is thus low in viscosity, it is easy to apply and impregnate it to the carpet cloth.

The following description is now provided about the method of applying and impregnating the sealer composition to the carpet cloth. This method is not specially limited, but in view of the low viscosity of the sealer composition it is usually suitable to adopt a roll coating method which is a known coating method.

According to the roll coating method, the sealer composition used in the invention is heat-melted to a temperature of, say, 120° C. to 220° C., then a coating roll heated to about the same temperature is brought into contact under rotation with the thus melted sealer composition, allowing a thin film of the sealer composition to be formed on the coating roll, and then this thin film is transferred onto a carpet cloth which is moving separately, whereby the sealer composition can be applied and impregnated easily to the carpet cloth.

In the case of a tile carpet, the amount of the sealer composition to be applied is generally in the range of 100 to 2,000 g/m$^2$, preferably 400 to 1,600 g/m$^2$.

The glass or polyester non-woven fabric used in the present invention is a non-woven fabric in which glass fibers or polyester fibers are arranged substantially in a disorderly and non-directional manner without definite longitudinal and transverse arrangement. The fibers can also be fixed by the entanglement of adjacent fibers, so it is not always necessary for the fibers to be bonded with each other. In point of such substantially disorderly arrangement of fibers, the glass or polyester non-woven fabric is clearly distinguished from the crossed fabric used in the invention which will be described later. The non-woven fabric in question may be a mixture of glass fibers and polyester fibers.

The glass or polyester non-woven fabric is inserted between both backing layers to improve the shape stability of the carpet. More particularly, since the contact area of the non-woven fabric with the backing layers is large, it is possible to stabilize the shape of the carpet effectively. In view of this point, the weight is in the range of 15 to 60 g/m$^2$ in the case of a glass non-woven fabric and it is in the range of 20 to 100 g/m$^2$ in the case of a polyester non-woven fabric. In each case, if the weight is smaller than the specified range, there will not be attained a satisfactory dimensional stability, and a higher weight exceeding the specified range is not desirable because delamination between the backing layers and the non-woven fabric will occur easily.

It is desirable to dispose the glass or polyester non-woven fabric in such a manner that the thickness ratio thereof to the backing layers (A) and (B) is in the range from 9:1 to 1:9 preferably 4:1 to 1:2. By so doing, the dimensional stability is enhanced.

The glass or polyester crossed fabric used in the invention is obtained by arranging bundles of glass or polyester fibers longitudinally and transversely and then fixing them with an adhesive or by weaving. In point of having a definite longitudinal and transverse arrangement, the glass or polyester crossed fabric is clearly distinguished from the foregoing glass or polyester non-woven fabric. The crossed fabric in question may be a mixture of glass fibers and polyester fibers.

By using the glass or polyester crossed fabric it is made possible to correct an imbalance which may occur in the product carpet due to a difference between the strength in the longitudinal direction and that in the transverse direction. This effect cannot be attained by the foregoing glass or polyester non-woven fabric in which glass or polyester fibers are arranged in a disorderly fashion.

In view of this point, the weight is in the range of 30 to 150 g/m² in the case of a glass crossed fabric and it is the range of 10 to 120 g/m² in the case of a polyester crossed fabric. In each case, if the weight is smaller than the above-specified range, there will not be attained a correction of dimensional imbalance such as warping, and a higher weight exceeding the above-specified range is not desirable because delamination between the backing layer and the crossed fabric or the carpet base will occur easily.

In the present invention, the backing composition(s) and the sealer composition are laminated in a melted state to the aforementioned non-woven fabric and crossed fabric. Since the non-woven fabric and the crossed fabric each comprise fibers, fine concaves and convexes are present on their surfaces. Once the backing composition(s) and the sealer composition are melt-laminated to the non-woven fabric and the crossed fabric, they are bonded to the non-woven fabric and the crossed fabric through such concaves and convexes and also through engagement such as entanglement with the fibers, resulting in that a considerable bonding strength is obtained. However, it is preferred that the non-woven fabric and the crossed fabric have a certain degree of coarseness so as to permit the molten backing composition and sealer composition to permeate therethrough. By so doing, the backing and sealer compositions are bonded with the non-woven fabric and the crossed fabric to a satisfactory extent and there will be obtained a bonding strength high enough to cause no problem in practical use.

Since the backing composition(s) and the sealer composition used in the present invention are based on an amorphous polyolefin, they are low in melt viscosity and hence can easily permeate the non-woven fabric and crossed fabric; that is, they are desirable compositions for lamination with those fabrics.

The carpet cloth (a carpet base) is not specially limited. As examples there are mentioned tufted carpet, woven carpet, knitted carpet, needle punch carpet, needle felt carpet, felt and non-woven type like carpets. Particularly, tufted carpet base is usually preferred from the standpoint that it can easily attain the effect of the present invention.

As long as the backing layer (A), non-woven fabric layer, backing layer (B), crossed fabric layer and carpet cloth having the sealer layer (C) are laminated to one additional successively in this order, a suitable another layer may be provided between adjacent layers or on the upper surface of the backing layer (A) or on the lower surface of the carpet cloth. For example, another layer or plural other layers of the non-woven fabric or the crossed fabric may be further used in lamination, or an adhesive layer may be inserted between adjacent layers for improving the interlayer strength. Further, a protective film may be stuck on the upper surface of the backing layer (A) or on the lower surface of the carpet cloth.

Some manufacturing methods for the tile carpet of the present invention will be described below.

According to one method (I), first for the sealer layer (C), an amorphous polyolefin, a crystalline polyolefin, a tackifier resin and a filler which preferably contains magnesium hydroxide are melted and mixed in a heat-melting vessel and then applied onto a carpet cloth (a carpet base). In this way there is obtained a carpet cloth having a sealer layer.

Next, for constituting the backing layer (A), an amorphous α-olefin, a crystalline polyolefin, a tackifier resin, a wax and a filler containing magnesium hydroxide are melted and mixed in a melting vessel held at a temperature of, say, 200° C. When the composition which constitutes the backing layer (B) is different from that of the backing layer (A), it is also melted and mixed in the same manner, provided this is not needed if the same composition is used.

Then, onto an easily releasable substrate, e.g. belt of glass woven fabric coated with Teflon, which is moving at a predetermined speed, ① there is applied the composition as the backing layer (A) at a thickness of 0.5 to 5.0 mm, preferably 1.0 to 2.0 mm, ② a glass or polyester non-woven fabric is laminated thereon, ③ the composition as the backing layer (B) is applied at a thickness of 0.1 to 5.0 mm, preferably 0.5 to 2.0 mm, ④ a glass or polyester crossed fabric is laminated thereon, ⑤ the carpet cloth having the sealer layer (C) is laminated thereto, ⑥ these laminate constituents are compressed into an integral body, using rolls if necessary, followed by cooling, and ⑦ lastly the laminate as an integral body is cut into a predetermined shape, for example a square 500 mm in one side, whereby there is obtained a tile carpet as a final product.

According to another method (II), compositions for the backing layers (A), (B) and sealer layer (C) are prepared by heat-melting and mixing the respective components.

Then, ① the composition of the sealer layer (C) is applied in a melted state onto a carpet cloth placed on a moving belt, ② a glass or polyester crossed fabric is lamintate thereon, ③ the composition for the backing layer (B) is applied at a thickness of 0.1 to 5.0 mm, preferably 0.5 to 2.0 mm, ④ a glass or polyester non-woven fabric is laminated thereon, ⑤ the composition for the backing layer (A) is applied at a thickness of 0.5 to 5.0 mm, preferably 1.0 to 2.0 mm, ⑥ these laminate constituents are compressed into an integral body using rolls, followed by cooling, and ⑦ lastly the laminate as an integral body is cut into a predetermined shape, for example a square 500 mm in one side, whereby there is obtained a tile carpet as a final product.

Of the above two methods, in the first method (I), as mentioned above, a melted backing composition is applied onto an easily releasable substrate, then a non-woven fabric, etc. is laminated thereto, and lastly a carpet cloth is laminated to the so-laminated constituents. According to this method, since the carpet cloth is applied last heat deterioration is minimized not only in the carpet cloth but also in the backing compositions applied in a method state. This is because Just after the last lamination of the carpet cloth the resulting laminate sheet is immediately moved to a cooling zone and cooled therein. On the other hand, in the foregoing method (II), since a carpet cloth is first placed on a belt, the residence time in the heating zone is long and hence heat deterioration is apt to occur. The heat deterioration also influences the dimensional stability of the resulting tile carpet as product, and the tile carpet which has undergone heat history is apt to deteriorate in its dimensional stability.

The carpet cloth also has a heat insulating property, so if the carpet cloth is first placed on the belt and a melted backing composition is laminated thereon, the transfer of heat from the melted backing composition to the belt with which it is in contact through the carpet cloth, is difficult to occur, and the cooling must rely on a mere dissipation of heat into the air. Thus, the cooling is difficult, and this inevitably leads to heat deterioration of the backing composition.

Preferably, therefore, the foregoing method (I) is adopted in the present invention.

The tile carpet of the present invention has a slight backward warp so that it easily comes into close contact with the floor surface. This shape is desirable in practical use.

Such shape means that a slight warp is recognized in the backward direction of the title carpet when one picks up one side of the carpet, then allows it to hang down and observes the state of warp of the carpet from above. Due to such warp, when the carpet is placed on a flat floor surface, at least the corner and peripheral portions thereof come fully into close contact with the floor surface by its own weight even without application of any special load thereto.

When the tile carpets according to the present invention are laid in a tile form on a floor surface, a gap is not formed between adjacent tiles because they do not undergo changes even with the lapse of time and are superior in dimensional stability.

Besides, they come into close contact with the floor surface because of having a slight warp backward.

Further, the amount of fume and that of harmful gases evolved during combustion of the tile carpet are small and thus the tile carpet of the invention is superior in the sealing effect.

[Examples]

The present invention will be described below in more detail with reference to the accompanying drawing.

In each of the following Examples and Comparative Examples there was used the same composition for both backing layers (A) and (B), provided the composition for the backing layer (A) and that for the backing layer (B), which are the same composition, are designated compositions A and B, respectively, for convenience' sake.

As the tile carpet manufacturing method there was adopted the foregoing method (I). More specifically, with reference to FIG. 1, an endless belt 3 made of a glass non-woven fabric and coated with TEFLON® is allowed to travel, in its rotating process, successively in a closely contacted state on both a heating plate 15 located on an upstream side and a cooling plate 14 located downstream in a slightly spaced relation to the heating plate. Since the belt 3 is in close contact with the heating plate 15 and the cooling plate 14, there are constituted heating and cooling zones, whereby the belt is heated and cooled.

Above the belt 3 are disposed two knife coaters 10a and 10b spaced a predetermined distance from each other in a discharge section of the heating plate 15, and laminating rolls 13a and 13b are disposed respectively between both knife coaters 10a and 10b and between both plates 15 and 14.

Composition (A)(11a) of a tabulated formulation for the backing layer (A), which composition is in a heat-melted and mixed state, is applied onto the belt 3 from the knife coater 10a through a doctor knife 12a continuously at a predetermined thickness. Then, before cooling this composition, a glass or polyester non-woven fabric 16 shown in table below is laminated onto the thus-coated surface continuously through the laminating roll 13a. Onto the thus-laminated glass or polyester non-woven fabric 16 is applied a melt-mixed composition (B) [same as the above composition (A)] for the backing layer (B) continuously from the knife coater 10b through a doctor knife 12b at a predetermined thickness.

Further, a glass or polyester crossed fabric 17 shown in table below and a tufted carpet cloth 1 having a sealer layer (C) (not shown) which will be described later are brought into pressure contact with the coated surface of the composition (B) (11b) integrally in a lapped form through the laminating roll 13b so that the crossed fabric 17 underlies the carpet cloth 1. The glass or polyester non-woven fabrics 16 and crossed fabrics 17, and the tufted carpet cloth 1 are fed in synchronism with the belt 3.

The resulting tile carpet as an integral laminate is then cooled rapidly in the cooling zone formed by the cooling plate 14, then, though not shown, it is separated from the belt 3 and cut into a 500 mm square shape to afford a tile carpet as product.

Since the backing operation is performed in the heating zone constituted by the heating plate 15, even when plural backing operations are performed and therefore a longer time is required in the backing process, the compositions which have been applied in a melted state are not cooled, with the result that a satisfactory bonding strength is ensured between adjacent layers.

Further, since the tile carpet as an integral laminate is cooled rapidly in the cooling zone, it will scarcely undergo heat deterioration and coupled with the plural-layer lamination of the non-woven fabric and crossed fabric, there can be obtained a tile carpet superior in dimensional stability.

The tufted carpet cloth having the sealer layer (C) has been prepared in the following manner.

A composition for the sealer layer (C), comprising 28 wt% of an amorphous ethylene-propylene copolymer, viscosity at 190° C.:8,500 cP, softening point: 141° C. (as determined by a ring and ball method), sold by UBE Rexin Co., Ltd. under the trade name of APAO RT2385 1.9 wt% of acrystalline polypropylene (MFR 40), 10 wt% of a hydrogenated resin (Arcon 100M, a trade name of Arakawa Kagaku Co.), 10 wt% of magnesium hydroxide, 50 wt% of calcium carbonate and 0.1 wt% of a lubricant (stearic acid) was placed into an electrically heated vessel of a coating apparatus and melted. While the temperature was held at 175° C., the resulting melt was applied to the back of a tufted carpet cloth made of nylon, in an amount of 1,000 g/m$^2$, to afford a carpet cloth having a sealer layer.

TABLE 1

| NO. | Example 1 | Example 2 |
|---|---|---|
| [Composition (A)(B)] | | |
| Amorphous polyolefin | APAO RT2115 | APAO RT2385 |
| % | 22 | 43 |
| Crytalline polyolefin | PP | PP |
| % | 1.9 | 3 |
| Wax | Paraffin wax 145 | Micro-crystalline wax 145 |
| % | 6 | 3 |
| Filler | Magnesium hydroxide | Magnesium hydroxide |
| % | 10 | 20 |
| Filler | Calcium carbonate | Calcium carbonate |
| % | 60 | 30 |
| Others | Stearic acid | — |
| % | 0.1 | |
| [Laminating Sequence] | | |
| Composition (A) mm | 2.0 | 1.5 |
| Non-woven fabric | | |
| Kind | Glass | Glass |
| Weight g/m$^2$ | 35 | 45 |
| Composition (B) mm | 2.0 | 1.0 |
| Crossed Fabric | | |
| Kind | Polyester | Glass |
| Weight g/m$^2$ | 100 | 85 |
| Carpet cloth | Tufted carpet | Tufted carpet |

TABLE 1-continued

| NO. | Example 1 | Example 2 |
|---|---|---|
| with sealer | | |
| Normal Warp | Slight back warp | Slight back warp |
| Heat Deformation % | | |
| Longitudinal | 0.04 | 0.01 |
| Lateral | 0.06 | 0.03 |
| Heat Warp | Slight back warp | Slight back warp |
| Low-temperature Deformation % | | |
| Longitudinal | 0.07 | 0.05 |
| Lateral | 0.08 | 0.07 |
| Low-temperature Warp | Slight back warp | Slight back warp |
| Water Deformation % | | |
| Longitudinal | 0.05 | 0.02 |
| Lateral | 0.07 | 0.05 |
| Water Warp | Slight back warp | Slight back warp |
| Amount of Fume | 136 | 157 |
| Pile wear strength % | 0.02 | 0.01 |
| Pile extraction strength kgf/2 pc. | 4.3 | 4.6 |

APAO RT2115: amorphous polypropylene, viscosity 1,500 cP at 190° C., softening point 152° C. (ring and ball method)
APAO RT2385: amorphous ethylene-propylene copolymer, viscosity 8,500 cP at 190° C., softening point 141° C.
PP: crystalline polypropylene, MFR 40
Heat Deformation: dimensional change after heating at 60° C. for 2 hours and after standing 1 hour or more at room temperature (20° C.)
Low-temperature Deformation: dimensional change after cooling at −10° C. for 2 hours
Water Deformation: dimensional change after immersion in water and after drying at 20° C. for 24 hours
Amount of Fume: ASTM E662
Pile wear strength: JIS L1021, Taber abrader, truck wheel No. H38, revolution 10,000
Pile extraction strength: JIS L1021

TABLE 2

| NO. | Example 3 | Example 4 |
|---|---|---|
| [Composition (A)(B)] | | |
| Amorphous polyolefin | APAO RT2730 | APAO RT2280 |
| % | 27 | 36 |
| Crystalline polyolefin | PP | PP |
| % | 1.9 | 4 |
| Wax | Paraffin wax 145 | Micro-crystalline wax 145 |
| % | 6 | 10 |
| Filler | Magnesium hydroxide | Magnesium hydroxide |
| % | 10 | 15 |
| Filler | Calcium carbonate | Calcium carbonate |
| % | 55 | 35 |
| Others | Stearic acid | — |
| % | 0.1 | |
| [Laminating Sequence] | | |
| Carpet cloth with sealer | Tufted carpet | Tufted carpet |
| Crossed fabric | | |
| Kind | Polyester | Glass |
| Weight g/m² | 110 | 65 |
| Composition (A) mm | 1.5 | 1.2 |
| Non-woven fabric | | |
| Kind | Glass | Glass |
| Weight g/m² | 50 | 40 |
| Composition (B) mm | 1.5 | 1.0 |
| Normal Warp | Slight back warp | Slight back warp |
| Heat Deformation % | | |
| Longitudinal | 0.03 | 0.02 |
| Lateral | 0.06 | 0.04 |
| Heat Warp | Slight back warp | Slight back warp |
| Low-temperature Deformation % | | |
| Longitudinal | 0.06 | 0.04 |
| Lateral | 0.08 | 0.06 |
| Low-temperature Warp | Slight back warp | Slight back warp |
| Water Deformation % | | |
| Longitudinal | 0.04 | 0.03 |
| Lateral | 0.06 | 0.05 |
| Water Warp | Slight back warp | Slight back warp |
| Amount of Fume | 120 | 157 |
| Pile wear strength % | 0.02 | 0.01 |
| Pile extraction strength kgf/2 pc. | 3.8 | 4.4 |

APAO RT2730: amorphous ethylene-propylene copolymer, viscosity 3,000 cP at 190° C., softening point 110° C.
APAO RT2280: amorphous ethylene-propylene copolymer, viscosity 8,000 cP at 190° C., softening point 146° C.
PP: crystalline polypropylene, MFR 40
Heat Deformation: dimensional change after heating at 60° C. for 2 hours and after standing 1 hour or more at room temperature (20° C.)
Low-temperature Deformation: dimensional change after cooling at −10° C. for 2 hours
Water Deformation: dimensional change after immersion in water and after drying at 20° C. for 24 hours
Amount of Fume: ASTM E662
Pile wear strength: JIS L1021, Taber abrader, truck wheel No. H38 revolution 10,000
Pile extraction strength: JIS L1021

TABLE 3

| NO. | Com. Ex. 1 | Com. Ex. 2 |
|---|---|---|
| [Composition (A)(B)] | | |
| Amorphous polyolefin | APAO RT2115 | APAO RT2385 |
| % | 22 | 43 |
| Crystalline polyolefin | PP | PP |
| % | 1.9 | 3 |
| Wax | Paraffin wax 145 | Micro-crystalline wax 145 |
| % | 6 | 3 |
| Filler | Calcium carbonate | calcium carbonate |
| % | 70 | 50 |
| Others | Stearic acid | — |
| % | 0.1 | |
| [Laminating Sequence] | | |
| Composition (A) mm | 2.0 | 1.5 |
| Fabric | | |
| Kind | Glass non-woven fabric | Glass crossed fabric |
| Weight g/m² | 35 | 85 |
| Composition (B) mm | 2.0 | 1.0 |
| Carpet cloth without sealer | Tufted carpet | Tufted carpet |

| No. | Example 1 | Example 2 |
|---|---|---|
| Normal Warp | Slight back warp | Slight back warp |
| Heat Deformation % | | |
| Longitudinal | 0.04 | 0.17 |
| Lateral | 0.18 | 0.13 |
| Heat Warp | Slight back warp | Slight back warp |
| Low-temperature | | |

TABLE 3-continued

| Deformation % | | |
|---|---|---|
| Longitudinal | 0.08 | 0.21 |
| Lateral | 0.26 | 0.19 |
| Low-temperature Warp | Front warp | Slight back warp |
| Water Deformation % | | |
| Longitudinal | 0.07 | 0.12 |
| Lateral | 0.12 | 0.16 |
| Water Warp | Front warp | Slight back warp |
| Amount of Fume | 375 | 151 |
| Pile wear strength % | 0.42 | 0.39 |
| Pile extraction strength kgf/2 pc. | 0.84 | 0.92 |

APAO RT2115: amporphous polypropylene, viscosity 1,500 cP at 190° C., softening point 152° C. (ring and ball method)
APAO RT2385: amorphous ethylene-propylene copolymer, viscosity 8,500 cP at 190° C., softening point 141° C.

What is claimed is:

1. A carpet tile having a backward warp comprising a first backing layer composition comprising 13% to 88% amorphous polyolefin, 1% to 10% crystalline polyolefin, 1% to 30% tackifier resin, 0 to 30% wax and 10% to 85% filler including magnesium hydroxide; a layer of a glass or polyester non-woven fabric; a second backing layer composition comprising the same constituents present in the same concentration ranges as said first backing layer composition; a layer of a glass and/or polyester crossed fabric; and a carpet cloth layer backsized or sealed with a seal coat composition comprising 13% to 88% amorphous polyolefin, 1% to 10% crystalline polyolefin, 1% to 30% tackifier resin and 10% to 85% filler, wherein said first backing layer composition, said second backing layer composition and said seal coat composition are applied in the molten state whereby said layers are laminated to one another successively in the order recited and wherein all percentages are by weight, based on the total weight of the respective compositions.

2. A carpet tile as set forth in claim 1 wherein the thickness ratio of said first and said second backing layers is in the range of from 9:1 to 1:9.

3. A tile carpet as set forth in claim 1, wherein the filler contains 1% to 50% of magnesium hydroxide.

4. A carpet tile as set forth in claim 1 wherein said amorphous polyolefins of said first backing layer, said second backing layer and said seal coat are each selected from the group consisting of amorphous polypropylene, amorphous propylene-ethylene copolymer, amorphous propylene-butene copolymer and amorphous polybutene, said amorphous polyolefins of said first and said second backing layers characterized by a melt viscosity, measured at 190° C., of 1,000 to 30,000 cP, a number average molecular weight of 2,000 to 20,000, a softening point of 100° C. to 165° C., a penetration of 1 to 4.5 mm and a low-temperature flexing resistance of −10° C. to −35° C., said amorphous polyolefin of said seal coat characterized by a melt viscosity, as measured at 190° C., of 300 to 6,000 cP, a number average of molecular weight of 1,000 to 10,000, a softening point of 100° C. to 170° C., a penetration of 0.8 to 4 mm and a low-temperature flexing resistance of −5° C. to −30° C.

5. A tile carpet as set forth in claim 1, wherein the carpet cloth is a tufted carpet.

6. A carpet tile as set forth in claim 1 wherein said layer of a glass or polyester non-woven fabric is a glass non-woven fabric present in a weight of 15–60 g/m$^2$.

7. A carpet tile as set forth in claim 1 wherein said layer of a glass or polyester non-woven fabric is a polyester non-woven fabric present in a weight of 20–100 g/m$^2$.

8. A carpet tile as set forth in claim 1 wherein said layer of a glass and/or polyester crossed fiber is a glass crossed fiber present in a weight of 30–150 g/m$^2$.

9. A carpet tile as set forth in claim 1 wherein said layer of a glass and/or polyester crossed fiber is a polyester crossed fiber present in a weight of 10–120 g/m$^2$.

10. A carpet tile as set forth in claim 1 wherein said filler of said seal coat composition includes magnesium hydroxide.

* * * * *